Aug. 14, 1945.  F. P. NOFFSINGER  2,382,740
SPROCKET WHEEL
Filed July 10, 1943
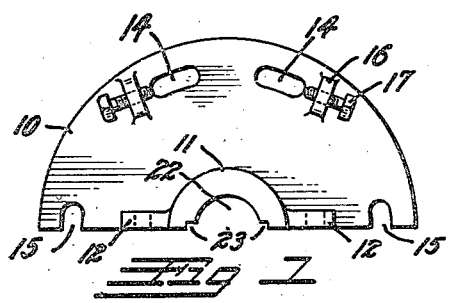
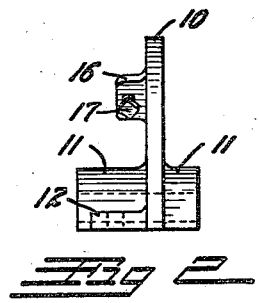
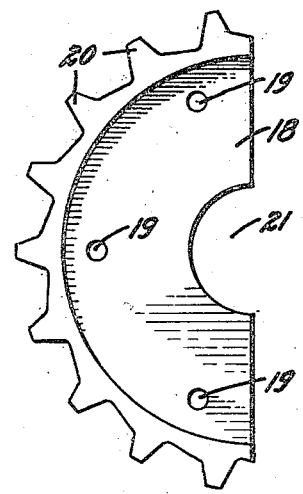
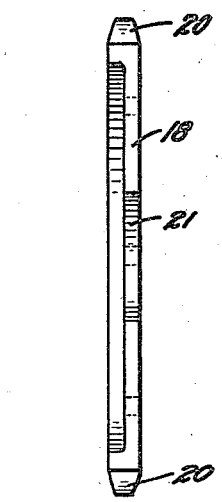
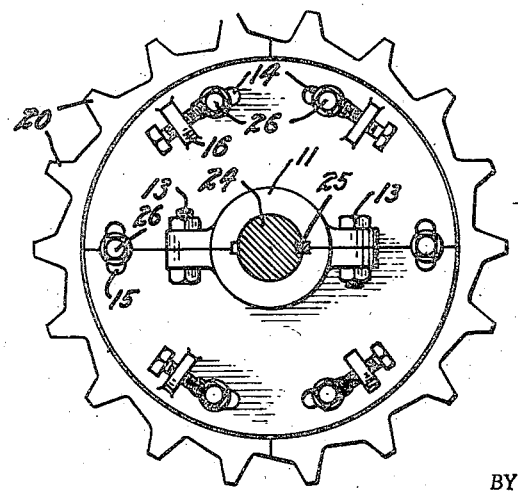
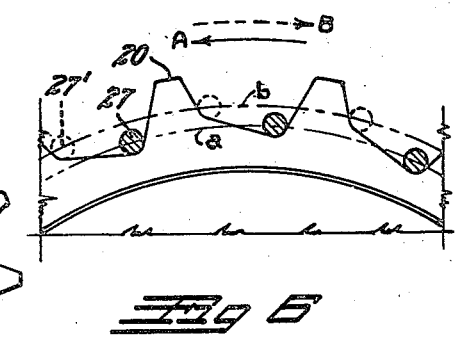
INVENTOR.
Fred P. Noffsinger
BY Patented Aug. 14, 1945

2,382,740

UNITED STATES PATENT OFFICE 2,382,740

SPROCKET WHEEL

Fred P. Noffsinger, Greeley, Colo.

Application July 10, 1943, Serial No. 494,438

3 Claims. (Cl. 74—243)

This invention relates to a sprocket wheel for use with sprocket chains, more particularly for chains of the type such as employed for elevating and conveying materials.

Bar chains such as used on agricultural, road and excavating machines wear rapidly at the points of contact between the links themselves and at the points of contact between the bars and the teeth of the sprockets. This wear slowly increases the pitch of the chain, that is, the distance between the bars or links thereof. When this wear reaches a point where the product of the increase in pitch times the number of teeth in the sprocket exceeds the tooth pitch or distance between the sprocket teeth, the chain will climb to the tops of the teeth resulting in broken, bent, stretched and otherwise damaged chains.

The principal object of this invention is to provide a sprocket for this use which will have a greater pitch in one direction than in the other, so that, after the pitch of the chain has increased due to wear, the sprockets at the opposite sides of the chain can be transposed to reverse their direction of rotation so as to automatically increase their pitch diameter to accommodate the increased pitch of the chain.

Bar chains of the type used on conveying machinery, potato diggers and the like employ two sprockets at each extremity of the run of the chain. These sprockets are positioned at opposite sides of the chain and are keyed in pairs on a common shaft. The key ways in the shaft must be accurately cut to maintain the respective teeth of the two sprockets in accurate alignment so as to avoid unequaled strains and twisting of the bar chain.

Another object of this invention is to provide a bar-chain sprocket in which the toothed periphery thereof can be rotated for adjustment in either direction to bring the teeth of cooperating sprockets into alignment regardless of any inaccuracies in the placement of the keyways or sprockets on the shaft.

Other objects of the invention are:

To provide a multipiece sprocket consisting of only two interchangeable parts so that the confusion of right and left hand elements will be eliminated;

To provide a sprocket in which the toothed portion thereof can be quickly and easily removed for replacement and repairs without disturbing the shaft or the hub portion of the sprocket;

And to provide a sprocket which can be easily positioned on the shaft with or without keys and without disturbing the shaft setting or its bearings.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing—

Fig. 1 is a face view of a hub member section employed in the improved sprocket;

Fig. 2 is a side view of the hub member section of Fig. 1;

Fig. 3 is a face view of a toothed sector member employed in the invention;

Fig. 4 is a side view of the member of Fig. 3;

Fig. 5 is a face view of the complete assembled sprocket; and

Fig. 6 is a diagrammatic view illustrating a portion of the toothed sector member and its action upon the chain.

The improved sprocket is assembled from only two differing members, a semi-circular hub member and a semi-circular toothed sector member. Each complete sprocket requires two of each of the above members.

The hub member consists of a semi-circular flange disc 10 formed integrally with a semi-cylindrical hub 11 containing a shaft groove 22 for surrounding ½ of the shaft upon which the sprocket is to be used. A ½ key slot 23 extends along each side of the shaft groove. A pair of clamping ears 12 project oppositely outward from the hub 11. The latter are provided with suitable bolt holes for the reception of clamping bolts 13. The flange disc is provided with arcuately elongated bolt holes 14 adjacent its arcuate edge and with similarly elongated bolt notches 15 in its diametric edge. A screw lug 16 is formed on the disc at the extremity of each of the holes 14. A set screw 17 is threaded through each of the lugs 16 parallel to the face of the disc and directed toward the adjacent hole 14.

The toothed sector member comprises a semi-circular plate 18, one face of which is countersunk to receive the flange disc 10, as illustrated. The plate is provided with a series of bolt holes 19 positioned to register with the holes 14 in the flange disc 10 when the latter is in position in the countersunk depressions of the plate 18. A uniformly spaced series of sprocket teeth 20 project radially from the periphery of the curved edge of the plate 18. The plate is provided with an axial, arcuate notch 21 to receive the hub 11 of the hub member.

To assemble the sprocket on a shaft, such as illustrated at 24 in Fig. 5, two of the hub members are placed upon opposite sides thereof and clamped together by means of the clamp bolts 13. It will be noted that since the hub member contains two ½-key grooves, "right" and "left" hand pieces are avoided since the two ½-key grooves join to form two keyways in the sprocket, only one of which need be used to engage the shaft key, indicated at 25.

Two of the toothed sector members are now placed against the flange discs 10, the latter resting in the countersunk face of the former. The sector members are placed so that their joining line is at right angles to the joining line of the hub members, as illustrated. The toothed sectors are clamped to the flange discs by means of suitable clamp bolts 26 which pass through the bolt holes 14 and 19 in the members 10 and 18, respectively and also through the joined bolt grooves 15.

The improved sprocket is now ready for use. Due to the multiplicity of adjustment all machining, except for the set screws 17, is avoided. Both members may be simply cast with all holes cored. Should the shaft hole be slightly small or large, this can be accommodated by tightening the bolts 13 or shimming between the two halves without affecting the outside tooth diameter. Should the teeth of one sprocket be out of alignment with the teeth of its mate, the bolts 26 may be loosened and by loosening the alternate screws 17 and tightening the intermediate ones the toothed periphery can be adjusted either way to bring the teeth to alignment, after which, tightening of all the screws 26 and 17 locks the teeth in place.

It is desired to call particular attention to the multiple pitch design of the teeth, as illustrated more in detail in Fig. 6. Each tooth is designed on two root diameters, that is, the depth of each tooth on one side is greater than the depth of the tooth on the other side. This imparts an incline to the floor of the notch between adjacent teeth extending from the short side of one tooth to the long side of the next adjacent tooth.

Let us assume that the sprocket in Fig. 6 is rotating in the direction of the arrow A. This causes the bars of the chain, indicated in solid line at 27, to pull down against the long sides of the teeth and assume a pitch diameter as indicated at $a$. Now let us assume that the sprocket is rotated in the direction of the arrow B. This causes the bars to pull against the short sides of the teeth, as indicated in broken line at 27' and assume a larger pitch diameter, and wider pitch, as indicated by the pitch diameter $b$. The pitch diameter $a$ is the normal one for the chain for which the sprocket is designed and the two sprockets are originally placed upon the shaft to rotate in the direction of arrow A. After the chain becomes worn so as to materially increase the pitch thereof, the toothed sectors of the two sprockets at the opposite sides of the chain are interchanged to cause the teeth to face in the opposite direction. The effect is now as though the sprockets were rotating in the direction of arrow B. The increased pitch is thereby accommodated and the increased pitch diameter of the sprockets takes up all slack in the chain. Since the toothed segments are all interchangeable it is not necessary to disturb the position of the hub members on the shaft when making the interchange.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A chain sprocket comprising: two hub members; a semi-circular flange disc formed on each of said hub members; means for securing said hub members on opposite sides of a shaft so that said semi-circular flange discs will cooperate to form a complete circular flange; two semi-circular toothed segments; clamping bolts securing said segments to said flange to form a complete circular toothed rim thereabout, said bolts passing through circumferentially slotted openings so that the circumferential position of said rim may be varied at will on said flange; lugs extending laterally from the flanges adjacent ends of the slotted openings; and set screws threaded through said lugs and extending longitudinally of the slotted openings in position for engaging the bolts.

2. A chain sprocket comprising: two hub members; a semi-circular flange disc formed on each of said hub members; means for securing said hub members on opposite sides of a shaft so that said semi-circular flange discs will cooperate to form a complete circular flange; two semi-circular toothed segments; clamping bolts securing said segments to said flange to form a complete circular toothed rim thereabout, said bolts passing through circumferentially slotted openings so that the circumferential position of said rim may be varied at will on said flange; and set screws positioned to rotate said rim with reference to said flange when desired.

3. A chain sprocket comprising: two hub members; a semi-circular flange disc formed on each of said hub members; means for securing said hub members on opposite sides of a shaft so that said semi-circular flange discs will cooperate to form a complete circular flange; two semi-circular toothed segments; clamping bolts securing said segments to said flange to form a complete circular toothed rim thereabout, said bolts passing through circumferentially slotted openings so that the circumferential position of said rim may be varied at will on said flange; lugs formed on said flange adjacent said openings; and set screws threaded through said lugs and engaging said bolts to force the bolts and the circular flange in a circumferential direction about the axis of said shaft when desired.

FRED P. NOFFSINGER.